Figure 1:
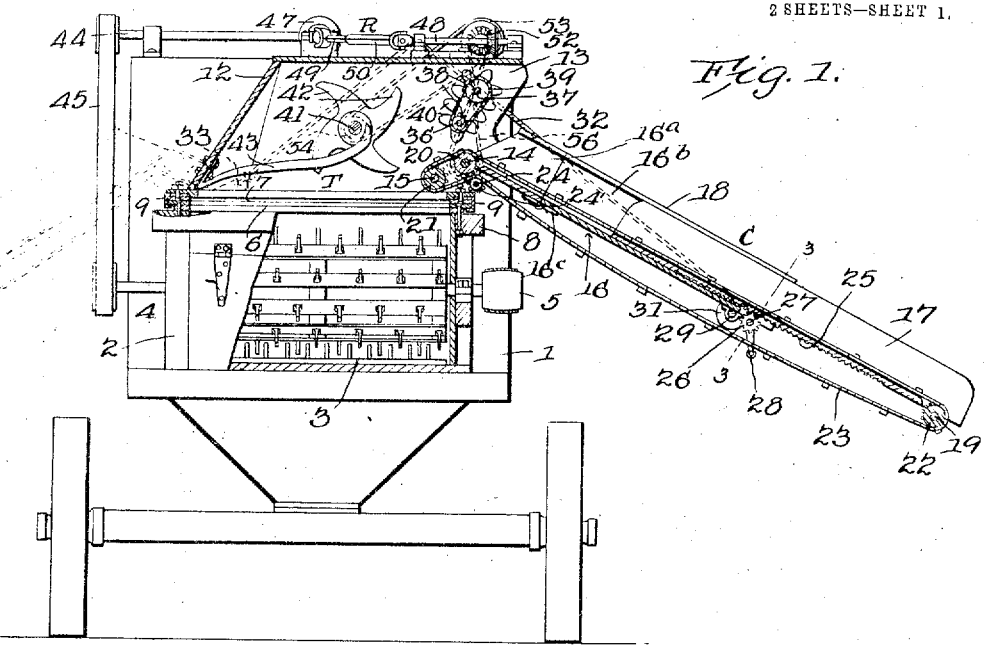

No. 858,843.  
PATENTED JULY 2, 1907.  
J. H. WILSON.  
FEEDER AND BAND CUTTER FOR THRESHING MACHINES.  
APPLICATION FILED MAR. 20, 1906.  
2 SHEETS—SHEET 1.

WITNESSES:  
E. F. Stewart  
Wm. Bagger

John H. Wilson,  
INVENTOR.  
By C. A. Snow & Co.  
ATTORNEYS.

No. 858,843. PATENTED JULY 2, 1907.
J. H. WILSON.
FEEDER AND BAND CUTTER FOR THRESHING MACHINES.
APPLICATION FILED MAR. 20, 1906.
2 SHEETS—SHEET 2.
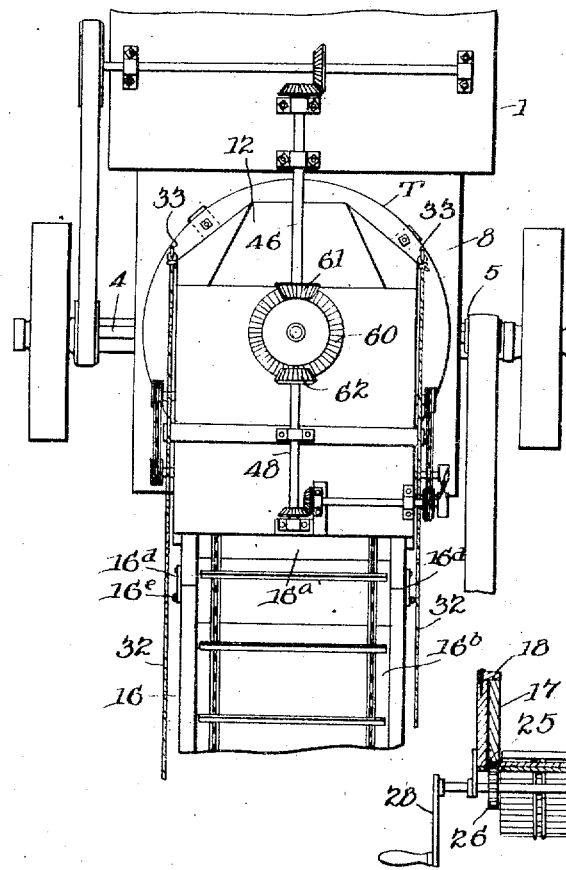
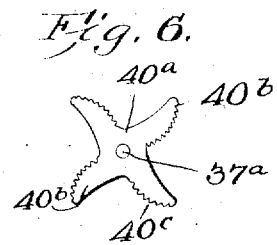
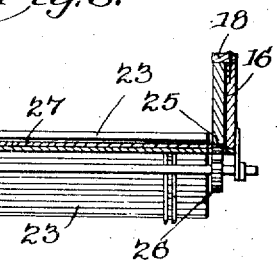
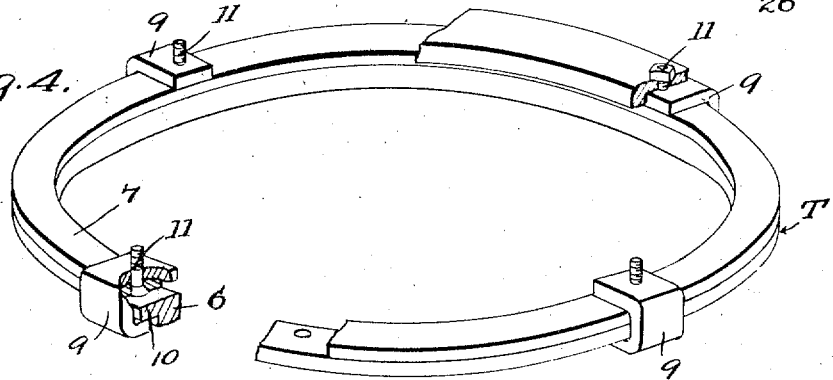
WITNESSES:
John H. Wilson,
INVENTOR
By C. A. Snow & Co.
ATTORNEYS

UNITED STATES PATENT OFFICE.

JOHN HOLMES WILSON, OF CARLISLE, PENNSYLVANIA.

FEEDER AND BAND-CUTTER FOR THRESHING-MACHINES.

No. 858,843.

Specification of Letters Patent.

Patented July 2, 1907.

Application filed March 20, 1906. Serial No. 307,105.

*To all whom it may concern:*

Be it known that I, JOHN HOLMES WILSON, a citizen of the United States, residing at Carlisle, in the county of Cumberland and State of Pennsylvania, have invented a new and useful Feeder and Band-Cutter for Threshing-Machines, of which the following is a specification.

This invention relates to self feeding and band cutting attachments for threshing machines.

One object of the invention is to construct a self-feeding attachment for threshing machines including a bundle carrier which is composed of a plurality of sections adapted to telescope together so as to be extensible and collapsible, and adjustable to various lengths, so that it may reach, if desired, into a mow in a barn or onto a stack of bundles.

Another object of the invention is to provide a band cutter and self feeder with a telescoping bundle carrier that may be reversed from one side of the threshing machine to the other side of the machine while the latter is in motion, or operation, without interfering with the operation of the band cutter and feeding mechanism, or the operation of the threshing machine.

A further object of the invention is to construct a self feeder and band cutter having a telescoping carrier upon a turn-table, so that it may be reversed or turned around from one side of the threshing machine to the other, in an arc of 180°, more or less, as desired.

A further object of the invention is to provide a self feeder and band cutter which dispenses with the use of the ordinary feed table and platform for the operator, thus shortening the machine and adapting the invention particularly to barn threshing.

A further object of the invention is to construct a self feeder and band cutter having a telescoping and reversible carrier mounted upon a turn-table in such a manner that the grain to be threshed will pass through the turn-table and be delivered onto the top of the threshing cylinder.

Another object of the invention is to provide improved means for raising and lowering the bundle carrier whereby the said carrier may be adjusted while the machine is in motion without interfering with surrounding objects.

Another object of the invention is to provide a simple and practical self feeder and band cutter whereby the old method of building a scaffold platform to pitch the bundles on is dispensed with.

Another object of the invention is to provide simple and efficient means for driving the feeding and band cutting mechanism of the reversible and telescoping carrier, in such a manner as not to interfere with the operation of the parts when the carrier is reversed from one side of the machine to the other.

Another object of the invention is to provide a simple and efficient self feeder and band cutter, which shall not be in the way when it is desired to have access to the cylinder or concave of the threshing machine in connection with which the device is being used.

Further objects of the invention are to simplify and improve the construction and operation of the class of devices to which the invention belongs.

With these and other ends in view, which will readily appear as the nature of the invention is better understood, the same consists in the improved construction and novel arrangement and combination of parts, which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be made, when desired.

Figure 2:
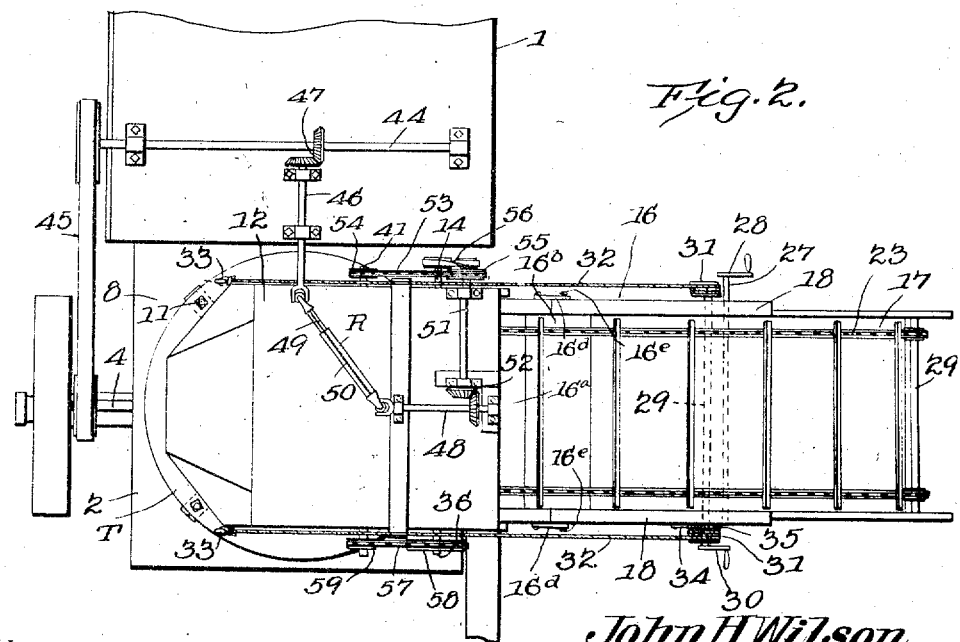

In the drawings, Figure 1 is a front view, partly in section, of a threshing machine equipped with a feeder and band cutter constructed in accordance with the principles of the invention. Fig. 2 is a top plan view of the same. Fig. 3 is a transverse sectional view of the bundle carrier taken on the plane indicated by the line 3—3 in Fig. 1. Fig. 4 is a perspective detail view of the turn-table forming a part of the invention. Fig. 5 is a top plan view illustrating a modification in the motion transmitting means. Fig. 6 is a detail view illustrating a modified form of the band cutting knives.

Corresponding parts in the several figures are indicated throughout by similar characters of reference.

1 designates a threshing machine of ordinary construction having the cylinder 2 and concave 3; the cylinder being mounted upon a shaft 4 which is supported for rotation in the usual manner and is provided at one end with a driving pulley 5 adapted to receive motion from some suitable source of power.

The frame of the threshing machine supports, directly above the cylinder 2, a turn-table T of suitable dimensions, said turn-table being composed of a flanged supporting ring 6 and a superposed rotary member 7; the former being firmly bolted or otherwise suitably secured upon the framework 8 of the machine, while the rotary member 7 is provided with clips 9, 9 embracing and engaging the flange 10 of the member 6, and secured upon the rotary member 7 by means of bolts 11 which are extended upwardly, as will be clearly seen in Fig. 4, so that they will also serve for the mounting in position of the hood or casing 12 of the improved self feeding and band cutting attachment, which will be presently more fully described. This hood, being connected with the movable member of the turn-table by the assembling bolts 11, may obviously be turned or oscillated so that the inlet 13 at the front end of the hood may be presented to either side of the machine, towards the front, or at any desired intermediate angle.

The hood 12 is provided at the lower part of the inlet 13 with bearings for shafts 14 and 15, the former of which is located in advance of and above the latter. Hingedly mounted upon the shaft 14 is the trough 16 of the bundle carrier C, which latter includes an additional trough 17 which is adapted to telescope into the trough 16; the latter being provided with flanges, as 18, to retain the extension member 17 in proper relation therewith. The extension member 17 is provided near its lower end with bearings for a transverse shaft 19. The shafts 14, 15 and 19 are provided with sprocket-wheels 20, 21 and 22 respectively, over which is guided an endless conveyer or raddle 23, said raddle being also guided over idler sprocket wheels 24' upon a stationary shaft 24 beneath the shaft 14, which latter is driven in a manner to be hereinafter described for the purpose of operating the endless conveyer. The latter is preferably constructed with link belts in such a manner that its dimensions may be increased or reduced, as may be required, according to the adjustment of the extension member 17 of the carrier trough by the addition or removal of links of the belts; in other words, when the extension member is shot out for the purpose of increasing the length of the carrier trough, the endless carrier will be added to, while, when the carrier trough is shortened, portions or sections of the endless carrier will be detached, as will be readily understood.

The carrier trough 16 is preferably made in two parts or sections 16ᵃ and 16ᵇ connected with each other by means of a hinge joint 16ᶜ; and the side members of said parts or sections being provided, respectively, with hooks 16ᵈ and with staples 16ᵉ, whereby they may be secured in extended relation; it being understood that the strain upon the hooks and staples will not be extremely heavy, inasmuch as supporting means, to be hereinafter more fully described, are provided to support the carrier trough in position for operation. When the machine is not in use, the carrier may, owing to the presence of the hinge joint 16ᶜ, be folded in the direction of the front end of the machine and supported in a convenient position for transportation.

The under side of the extension member 17 of the carrier trough is provided with rack bars, as 25, meshing with pinions 26 upon a suitably supported transverse shaft 27 having at one end a crank 28 whereby it may be readily manipulated for the purpose of effecting the desired adjustment of the carrier trough. Means, such as a pawl and ratchet, may be provided for the purpose of locking or securing the shaft 27 in adjusted position, as will be readily understood.

The carrier trough 16 is provided near its outer end, on its under side, with bearings for a shaft 29 having an operating crank 30 and equipped with drums 31 with which are connected flexible members 32 which are suitably guided to points of attachment, as 33, upon the upper or movable member 7 of the turn-table, so that, by rotating the shaft 29 to wind or unwind the flexible members 32 from the drums 31, the free end of the carrier trough 16 may be raised or lowered to any desired position where it may be retained, as by means of a pawl 34 pivoted upon the carrier trough and engaging a ratchet wheel 35 upon the shaft 29.

Within the hood or casing 12, in the inlet 13 of the latter, there are supported shafts 36 and 37, each having sprocket wheels 38 over which are guided endless chains or link belts 39 carrying band-cutting knives 40, which latter are guided in such a manner as to sever the bands of the bundles which are carried thereunder by the endless conveyer herein described. In rear of the shafts 36 and 37 there is supported for rotation a shaft 41 having radial arms 42 which serve as pickers to scatter and disseminate the grain or straw contained in the bundles, the bands of which have just been severed. The picker arms 42 operate between a plurality of inclined grate bars or deflectors 43, whereby the grain is deflected downward upon the top of the threshing cylinder, as will be readily seen by reference to Fig. 1 of the drawings; said deflectors serving to guide or deflect the grain properly in any position of the feeding mechanism; the grate bars or deflectors 43 operate not only to deflect the grain, but also to keep the picker arms clean and free from entanglement with the straw.

A simple way of transmitting motion to the operative parts of the device has been illustrated in Figs. 1 and 2 of the drawings, where 44 designates a countershaft supported upon the deck of the threshing machine and receiving motion from the cylinder shaft 4 by means of a belt or band 45. A longitudinal shaft 46 supported for rotation in bearings upon the deck of the machine is connected by miter gearing 47 with the countershaft 44, so as to receive motion from the latter. A shaft 48 is supported for rotation in bearings upon the hood 12, and said shaft 48 is connected with the shaft 46 by means of a tumbling rod R, including telescoping members 49 and 50. The hood 12 supports a shaft 51 at right angles to the shaft 48 with which it is connected by miter gearing 52, and from the shaft 51 the picker shaft 41 is directly driven, as by means of a link belt 53 engaging sprocket wheels 54 and 55 upon the shafts 41 and 51, respectively. Motion is also transmitted from the shaft 51 to the carrier shaft 14, as by means of a belt or band 56. From the picker shaft 41, a link belt 57 serves to transmit motion to the shaft 36 of the band cutter, which will thus be driven; the band cutter shaft 36 being provided with a relatively large sprocket wheel 58 while the picker shaft has a relatively small sprocket pinion 59, so that the band cutter shaft will be driven relatively slowly.

In the modification illustrated in Fig. 5 of the drawings, there is mounted upon the hood 12, concentrically with the turn-table, an idle pinion 60 meshing with bevel pinions 61 and 62 upon the shafts 46 and 48, respectively; under this construction, the telescoping tumbling rod R may be dispensed with.

In Fig. 6 of the drawings, there has been shown a shaft 37ᵃ carrying cutting members 40ᵃ provided with radial blades 40ᵇ having sharp, preferably serrated or saw-toothed, cutting edges 40ᶜ; the use of a band cutting device of this character enables one shaft to be dispensed with, as will be readily understood.

From the foregoing description, taken in connection with the drawings hereto annexed, the operation and advantages of this invention may be readily understood by those skilled in the art to which it appertains. The construction is simple and relatively inexpensive.

The invention is capable of being applied to and used in connection with any threshing machine of ordinary construction, and the device is specially applicable and useful for indoors or barn threshing, since the threshing machine proper, by the use of the invention, may be considerably shortened, and the bundle carrier may be extended forward or to either side into the mouth or to the place where the bundles of grain are to be fed, thus dispensing with the labor of several men, and effecting a material saving in space.

An important advantage of the invention resides in the fact that the bundle carrier may be collapsed to a relatively short length, so that it may be readily shifted or reversed from one side of the machine to the other without being interfered with by uprights or posts, such as are commonly found in barns.

The general construction of the device is simple, and it is thoroughly efficient for the purposes for which it is provided.

Having thus described the invention, what is claimed is:—

1. In a feeder and band cutter for threshing machines, a circular flanged member secured upon the machine, a movable circular member supported for rotation upon the flanged member, clips connected with the movable member, a hood having a bundle carrier connected therewith, and connecting members assembling the movable member of the turn-table, the connecting clips and the hood.

2. In a feeder and bundle carrier for threshing machines, a turn-table supported upon the casing of the machine, a hood or casing supported upon and connected with the movable member of the turn-table, and an extensible and collapsible bundle carrier trough connected with the hood.

3. In a device of the class described, a turn-table including two annular members suitably supported and connected the one for rotation upon the other, a hood connected with the movable member of the turn-table and having an inlet at the front thereof, a shaft supported transversely across the inlet, and an extensible and collapsible bundle carrier trough hingedly supported upon the transverse shaft.

4. In a device of the class described, a turn-table including two annular members suitably supported and connected the one for rotation upon the other, a hood supported upon the movable member of the turn-table and having an inlet at the front thereof, a shaft supported transversely across the inlet, a carrier trough hingedly mounted upon said shaft, an extension trough telescopically engaging the carrier trough and having a transverse shaft, an endless carrier guided over the two shafts, means for adjusting the telescoping extension shaft, and means for driving the endless carrier.

5. In a device of the class described, a turn-table including two annular members suitably supported and connected the one for rotation upon the other, a hood supported upon the movable member of the turn-table and having an inlet at the front thereof, a shaft supported for rotation transversely across the inlet, an extensible and collapsible bundle carrier trough hingedly supported upon the transverse shaft, and means for adjusting the free end of the bundle carrier at various elevations; said means including a transverse shaft supported for rotation upon the bundle carrier, drums upon said shaft, and flexible members connected with said drums and guided to points of attachment upon the movable member of the turn-table.

6. In a device of the class described, a turn-table including two annular members suitably supported and connected, the one for rotation upon the other, a hood supported upon the movable member of the turn-table and having an inlet at the front thereof, a shaft supported for rotation transversely across the inlet, a bundle carrier including a trough hingedly supported upon the transverse shaft, a pair of shafts supported transversely across the inlet of the hood, sprocket wheels upon said shafts, endless chains guided over said sprocket wheels and having band cutting knives, and operating means.

7. In a device of the class described, a turn-table including two annular members suitably supported and connected the one for rotation upon the other, a hood supported upon the movable member of the turn-table and having an inlet in the front thereof, a plurality of shafts supported for rotation transversely across the inlet of the hood, and an extensible and collapsible bundle carrier trough hingedly supported upon one of the shafts, a telescoping extension member having a shaft at its outer end, and an endless raddle or carrier guided over the shaft at the outer end of the extension member and over the several shafts supported across the inlet of the hood.

8. In a feeder and bundle carrier for threshing machines, a hood or casing supported for rotation upon an annular turn-table mounted upon the machine and through which material may be fed, and having an extensible and collapsible bundle carrier connected therewith.

9. In a feeder and bundle carrier for threshing machines, a hood or casing supported for rotation upon an annular turn-table mounted upon the machine and through which material may be fed, a carrier trough connected with said turn-table said carrier trough being composed of two parts or sections hingedly connected with each other, and an extension member telescopically connected with said carrier trough.

10. In a feeder and bundle carrier for threshing machines, a hood or casing supported for rotation upon an annular turn-table mounted upon the machine and through which material may be fed, a carrier trough connected with said turn-table said carrier trough being composed of two parts hingedly connected, means for supporting the carrier trough in extended and in folded position, and a telescoping trough extensibly and collapsibly connected with the main carrier trough.

In testimony that I claim the foregoing as my own, I have hereto affixed my signature in the presence of two witnesses.

JOHN HOLMES WILSON.

Witnesses:
W. H. PEFFER,
M. M. DOUGHERTY.